(12) United States Patent
Wang et al.

(10) Patent No.: US 6,587,180 B2
(45) Date of Patent: Jul. 1, 2003

(54) ADJUSTABLE LIQUID CRYSTAL BLAZED GRATING DEFLECTOR

(75) Inventors: Xu Wang, San Jose, CA (US); Demetri Psaltis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/820,100

(22) Filed: Mar. 27, 2001

(65) Prior Publication Data

US 2002/0003601 A1 Jan. 10, 2002

Related U.S. Application Data

(60) Provisional application No. 60/192,646, filed on Mar. 27, 2000.

(51) Int. Cl.⁷ ................................................ G02G 1/13
(52) U.S. Cl. .................................................... 349/202
(58) Field of Search .................................. 349/201, 202

(56) References Cited

U.S. PATENT DOCUMENTS

| | | | |
|---|---|---|---|
| 4,850,681 A | 7/1989 | Yamanobe et al. | 349/202 |
| 4,850,682 A * | 7/1989 | Gerritsen | 349/202 |
| 5,013,141 A * | 5/1991 | Sakata | 349/202 |
| 5,615,029 A * | 3/1997 | Moddel et al. | 349/202 |
| 6,014,197 A * | 1/2000 | Hikmet | 349/202 |
| 6,172,792 B1 | 1/2001 | Jepsen et al. | 359/254 |

* cited by examiner

*Primary Examiner*—Toan Ton
*Assistant Examiner*—Dung Nguyen
(74) *Attorney, Agent, or Firm*—Fish & Richardson P.C.

(57) ABSTRACT

A system of beam steering using electrical operation. A first system provides a grating and a liquid crystal material. When the liquid crystal is unenergized, there is a mismatch between the liquid crystal and the grating, causing the grating to diffract the light in a specified direction. The liquid crystal is energized to match its index of refraction to the grating. Then, the light is not diffracted by the grating, and hence travels in a different direction then it would when the liquid crystal was not energized. Another, finer system, forms electrically generated gratings using a liquid crystal material.

31 Claims, 2 Drawing Sheets

ADJUSTABLE LIQUID CRYSTAL BLAZED GRATING DEFLECTOR

CROSS-REFERENCE TO RELATED APPLICATIONS

This application claims benefit of U.S. Provisional Application No. 60/192,646, filed Mar. 27, 2000.

BACKGROUND

Gratings can be used for many purposes, including as optical filters. A grating can be formed as a hologram on a substrate. Light which matches the grating is then deflected in a specified way.

Many optical applications such as optical networking, optical switching, projection displays, optical data storage and optical holographic applications, may need to steer an optical beam in a desired direction.

SUMMARY

The present application teaches forming a plurality of stacked adjustable gratings which can be used for beam steering.

BRIEF DESCRIPTION OF THE DRAWINGS

These and other aspects will now be described in detail with reference to the accompanying drawings, wherein.

DETAILED DESCRIPTION

The present system forms an addressable beam deflector. The addressing may deflect an incoming optical beam to one of a plurality of different steering angles.

Figure 1:
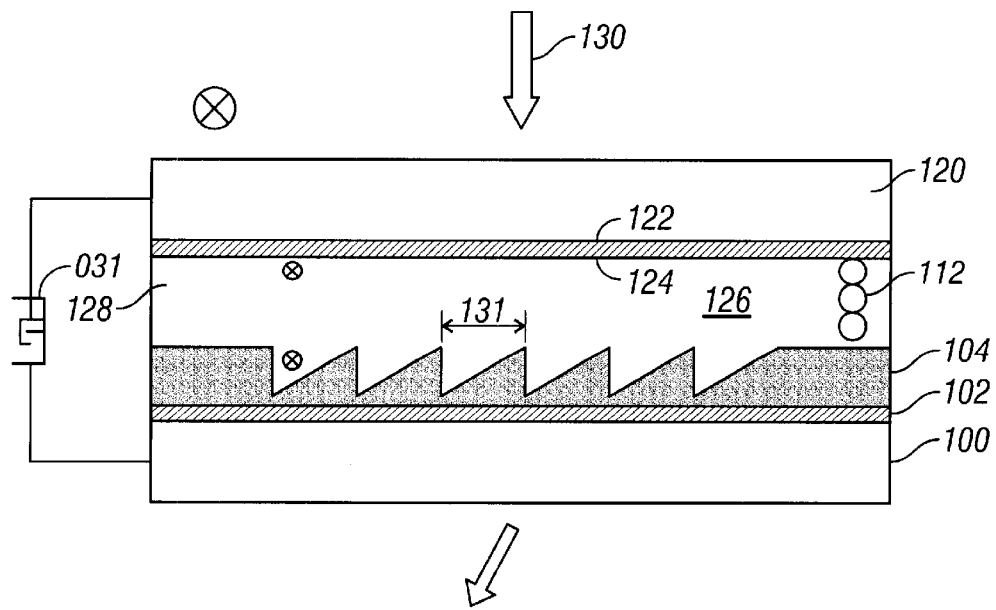
FIG. 1 shows a single layer crystal beam deflector.

A first embodiment comprising a single-layer liquid crystal beam deflector is shown in FIG. 1. This device includes a substrate of glass or other optically transparent material 100. The glass is covered with an Indium Tin Oxide (ITO) layer 102. A layer of Polymethyl methacrylate (PMMA) 104 is formed as blazed grating on the ITO layer 102. The blazed grating can be formed by direct E beam lithography on the substrate. The E beam lithography may form the PMMA layer into the shape of a grating, having a specified period 131.

Either one or a number of fiber spacers 112 may cover the PMMA grating. These fiber spacers may be configured to leave a space of 0.25 to 3 microns as the width of cavity used to form the space 126.

Glass substrate 120, also having an ITO layer 122, may cover the spacers 112. The spacers define a cavity 126, along with the substrate 120 and substrate 100.

The cavity is filled with liquid crystal material 128, preferably a nematic type liquid crystal material 128. For example, the liquid crystal material may be Merck E7, whose refractive indices at a 633 nm wavelength for extraordinary and ordinary light are respectively 1.737 and 1.5815.

An electrical field is applied between the ITO layer 102, which is under the grating, and the other ITO layer 122, which is above the grating.

The electro-optic affect of the nematic liquid crystal 128 changes the orientation of the liquid crystal, and hence the refractive index for extraordinary light, according to the modulation of the driving voltage applied between the ITO layers 102, 122. Therefore, the phase information which is applied to the grating 104 depends on the electric field applied between the ITO gratings.

The system can be operated in a binary mode. When an electric field is present, the refractive indices of the PMMA grating 104 and liquid crystal 128 are different. Hence, a strong diffraction is produced by the refractive index/phase difference between the grating and liquid crystal when the voltage is in the off state. The effective diffraction efficiency may be determined by the parameters of the blazed grating, such as grating depth, grating period, and blaze profile.

An electric control element 131 is used to apply an electric field between the substrates 100, 120. When the electric field is applied between the electrodes, the refractive index of the liquid crystal is decreased. At a specified driving voltage, "index matching" occurs between the PMMA material 104, and the liquid crystal 128. When this happens, the entire liquid crystal/PMMA composite grating structure can then be considered as an optically flat plate. Little or no diffraction occurs in this state.

Hence, the device can be viewed as an electrically controlled binary switch. The incident beam can either be deflected when in the off state, or undeflected when in the on state.

Moreover, this device may work preferentially for extraordinary light, and hence form a polarized beam deflector. The incident light 130 needs to have a polarization direction that is the same as the liquid crystal extraordinary light direction, which is also the "rubbing" direction for the homogeneous alignment configuration. The rubbing direction can be established by rubbing one of the glass plates, to cause the liquid crystal to align along the specified direction.

Figure 2:
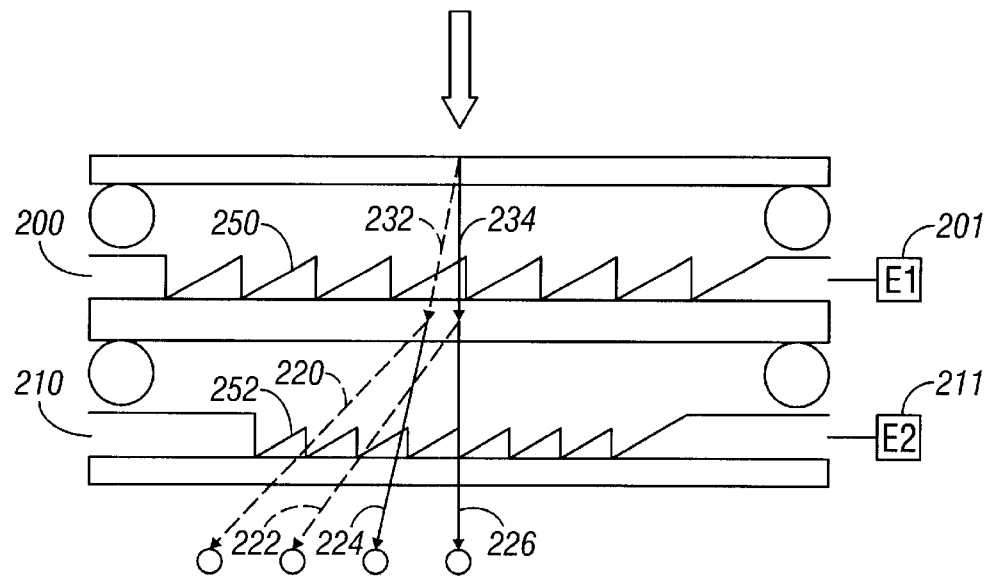
FIG. 2 shows a stacked, positive grating with a number of layers.

FIG. 2 shows a system that allows controlling the system to deflect the beam to multiple angles. Several layers 200, 210 of the LC/PMMA composite blazed grating are formed. Each of these layers may be of the general structure shown in FIG. 1. Each of a plurality of the gratings may have different grating periods (131 in FIG. 1. One embodiment may use a stack that has the period of the top grating 250 being double the period of the bottom grating 252. This may make all steering angles clearly resolvable.

Each layer may effectively have different driving conditions selected by the electronic control structure that is associated with the layer. Later 200 includes an associated electronic control structure 201. Layer 210 includes an associated electronic control structure 211. The two control structures can be the same so long as they can provide separate driving voltages to the respective gratings. By driving the layers in this way, multiple steering angles may be achieved. The available number of steering angles is $2^N$, where N is the number of stacked layers. In a dual layer system such as in FIG. 2, the output can be in one of four different directions 220, 222, 224, 226, as shown. The direction of the outputs depends on the driving condition combinations. The first layer 220 deflects the light 230 into one of two different directions 232, 234. The second layer 210 deflects each of these two beams in one of two different directions. Beam 232 can be deflected as either direction 220 or 224. Seam 234 can deflect into either direction 222 or 226.

Similarly, a four layer embodiment may provide 16 dynamically addressable angles.

In order to increase the number of layers beyond the four layers which have been described above, the performance of each individual layer may need to be further optimized. The optimization can be done by fine-tuning the PMMA blazed grating fabrication process. Also, improving the blaze profile and depth control can allow an increase the number of layers that may be deposited.

In another embodiment, anti reflection coatings may be deposited on each layer in order to reduce scattering inside the stacked layers. Another improvement may use a specific liquid crystal material that has improved index matching with the PMMA.

Figure 3:
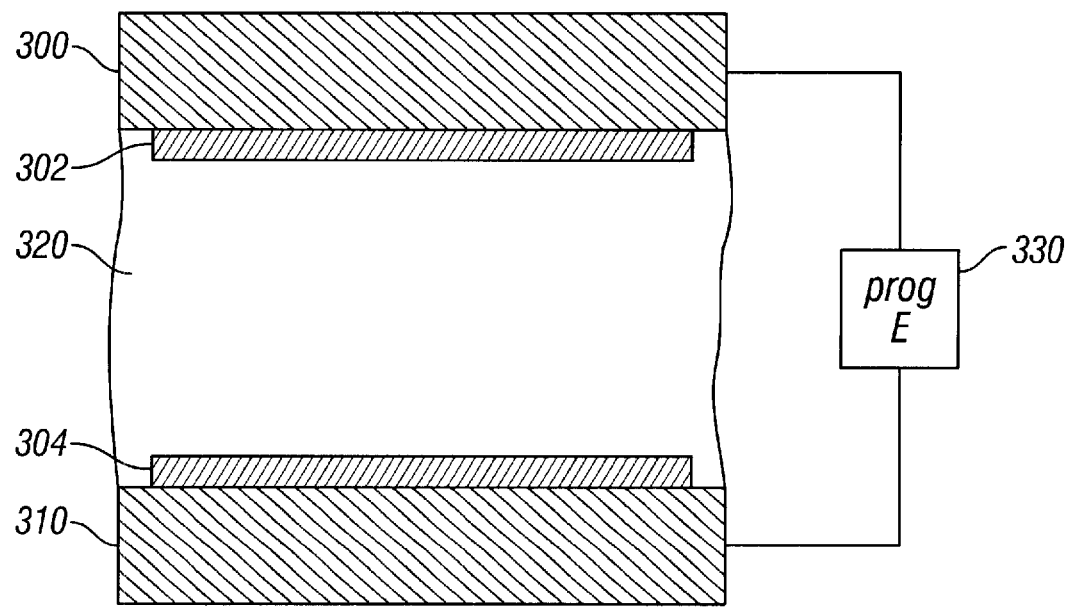
FIG. 3 shows an electronically controlled grating system, which forms a virtual grating.

Another embodiment is shown in FIG. 3. In this embodiment, a grating is formed electrically. The electrically formed grating is called a virtual grating. This may use a cascading approach to form an electrically generated blazed grating as described in Resler et al "High Efficiency Liquid Crystal Optical Phased array beam steering: Optics Letter, Vol 21, pp 689–691, and Wang et al, "Liquid Crystal on Silicon Beam deflector, SPIE, Vol 3633, PP 160–169.

FIG. 3 shows the operation. Two cover glass substrates 300, 310 are formed with patterned electrodes 302, 304 thereon.

A liquid crystal layer is used to build up a virtual blazed grating inside the liquid crystal medium. Appropriate voltages are assigned along the electrodes to form virtual blazed gratings in the liquid crystal. The assignment of appropriate voltages may generate a device which can be addressed to deflect beams into multiple angles.

It may be easiest to make this electrically generated blazed grating with a relatively fine scanning and hence a relatively small angle. Therefore, this system may operate best when used as a "fine" scanning component. In contrast, the liquid crystal/PMMA blazed grating may form a normally small period. This may be used as the coarse scanning component.

Figure 4:
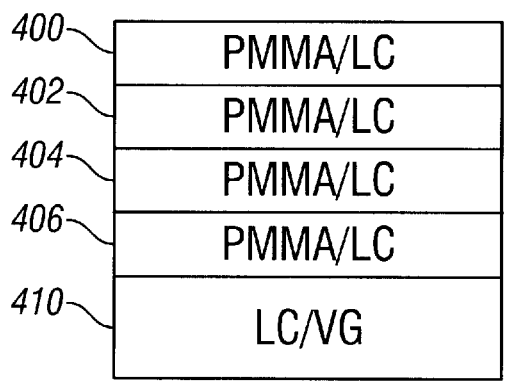
FIG. 4 shows a composite system of blazed grating/liquid crystal layers, mixed with a liquid crystal virtual grating layer.

The embodiment shown in FIG. 4 combines a four stacked layer blazed grating/LC coarse scanning component, with the virtual grating layer fine scanning component described with reference to FIG. 3. The composite structure includes 4 layers of PMMA blazed grating/LC materials 400, 402, 404, 406, and a single layer 410 of the virtual electrically generated blazed grating. This may yield a steering device with a large number of addressable angles.

For example, The period of the electrically generated grating can be programmed to 80 microns, 160 microns, 320 microns, 640 microns and 1280 microns. This system forms addressable angles which is $16 \cdot 2^5 = 512$. In the embodiment of FIG. 2, these many directions would require nine layers of liquid crystal/PMMA grating. The hybrid approach may reduce the number of layers, hence increasing the throughput and simplifying the final device.

Although only a few embodiments have been disclosed in detail above, other modifications are possible. For example, while the above has described using nematic liquid crystal, ferroelectric liquid crystals may be used in order to provide a faster switching speed. While the grating is described as being formed from PMMA, any material can be used to form the gratings, but preferably an etchable material.

All such modifications are intended to be encompassed within the following claims, in which:

What is claimed is:

1. A system, comprising:
    a first composite membrane including a grating, and an electrically controllable element, controlling a refraction of said grating;
    a second, composite membrane, including a grating and an electrically controllable element, controlling a refraction of said grating; and
    a control device, controlling said first and second composite membranes to control the direction of steering of an incoming beam based on controlling both said first composite membrane and said second composite membrane, wherein said first composite membrane has a grating with a first period, and said second composite membrane has a grating with a second period which is double said first period.

2. A system as in claim 1, wherein said electrically controllable element in said first and second composite membranes includes a liquid crystal material.

3. A system as in claim 2, wherein said electrically controllable element further comprises first and second electrodes, controlling a state of said liquid crystal material, in a way that controls a refraction of said grating.

4. A system as in claim 3, wherein said state of said liquid crystal is controlled between a first state in which refraction is caused between said liquid crystal and said grating, and a second state in which refraction is minimized between said liquid crystal and said grating.

5. A system as in claim 4, wherein said gratings are formed of polymethyl methacrylate PMMA.

6. A system as in claim 2, further comprising at least one additional, composite membrane, wherein there are N membranes, and said steering is allowed between $2^N$ different directions.

7. A system as in claim 2, wherein said liquid crystal material is a nematic liquid crystal material.

8. A system as in claim 2, further comprising first and second controllable voltage elements, respectively controlling a voltage of said first and second composite membranes.

9. A system, comprising:
    a first composite membrane including a grating, and an electrically controllable element, controlling a refraction of said grating;
    a second, composite membrane, including a grating and an electrically controllable element, controlling a refraction of said grating; and
    a control device, controlling said first and second composite membranes to control the direction of steering of an incoming beam based on controlling both said first composite membrane and said second composite membrane wherein said first composite membrane has a grating with a first period, and said second composite membrane has a grating with a second period which is double said first period, wherein said electrically controllable element in said first and second composite membranes includes a liquid crystal material, an electrically generated grating, coupled to one of said first and second composite membranes, to form additional steering directions.

10. A system as in claim 9, wherein said first and second composite membranes are used for coarse steering, and said additional steering mechanism is used for fine steering.

11. A system, comprising:
    an optically transparent substrate with an electrode, patterned thereon;
    a liquid crystal material, in contact with said electrode, and controlled by a voltage on said electrode between first and second states; and
    a plurality of gratings, in contact with said liquid crystal material, said plurality of gratings respectively providing a plurality of steering directions to incoming optical light based on a state of said liquid crystal material as controlled by said voltage, wherein said plurality of gratings are formed of an etchable material and one of said gratings has double the period of another of said gratings.

12. A system as in claim 11, wherein said etchable material is an acrylate material.

13. A system as in claim 11, wherein said plurality of gratings are respectively located in a plurality of different stacked layers.

14. A system as in claim 13, wherein there are two of said stacked layers.

15. A system as in claim 13, wherein there are four of said stacked layers.

16. A system as in claim 11, further comprising a control voltage generator, generating control voltages to control said liquid crystal material.

17. A system as in claim 16, wherein said control voltage generator generates a first control voltage which controls the liquid crystal to have a different index of refraction than the grating, and generates a second control voltage to control the liquid crystal to have an index of refraction that is matched to said grating.

18. A system as in claim 16, wherein said control voltage generator controls the liquid crystal material between a first state in which the grating diffracts light, and a second state in which the grating does not diffract light.

19. A system as in claim 18, wherein said first state is one in which the liquid crystal has a different index of refraction than the grating, and said second state is a state in which the liquid crystal has a similar index of refraction to an index of refraction of the grating.

20. A method, comprising:
applying incoming optical light to an interface between a liquid crystal material and a grating; and controlling properties of the liquid crystal material to either match or mismatch to properties of the grating to control a direction of an outgoing light beam, wherein said controlling comprises controlling a plurality of layers of liquid crystal material and grating to provide a plurality of different beam steering directions and wherein one of the gratings has double the period of another of said gratings.

21. A method as in claim 20, wherein there are N layers, and said controlling comprises controlling said beam to be steered between $2^N$ different directions.

22. A method as in claim 20, wherein said controlling properties comprises controlling the property of said liquid crystal material to match the properties of the grating to minimize an amount of diffraction at the liquid crystal/grating interface, and controlling the property of said liquid crystal material to mismatch the properties of said grating, to cause diffraction at the liquid crystal/grating interface.

23. A method as in claim 20, wherein said controlling comprises controlling N layers of liquid crystal material to provide one of $2^N$ different steering directions.

24. A method as in claim 20, where N=2.

25. A method as in claim 20, wherein N=4.

26. A method as in claim 23, wherein said controlling comprises controlling a property of the liquid crystal material control an amount of refraction mismatch between the liquid crystal material and the grating.

27. A method as in claim 23, wherein said controlling comprises controlling a property of at least one of a plurality of layers of the liquid crystal material to control an amount of refraction mismatch between the liquid crystal material and the grating and hence control a refraction of said grating, and also to control another one of said layers to form of virtual grating therein.

28. A method, comprising:
applying incoming optical light to an interface between a liquid crystal material and a grating;
controlling properties of the liquid crystal material to either match or mismatch to properties of the grating to control a direction of an outgoing light beam wherein said controlling comprises controlling a plurality of layers of liquid crystal material and grating to provide a plurality of different beam steering directions and wherein one of the gratings has double the period of another of said gratings, and
providing an electrically generated grating to provide additional but finer beam steering control.

29. A system, comprising:
a first layer, including a first grating having a first period, a liquid crystal material in contact with said first grating, and first and second control electrodes, positioned to control a refraction property of said liquid crystal material between said first and second control electrodes;
a second layer, optically in series with said first layer, and including a second grating having a second period which is different than said first period, and a liquid crystal material in contact with said second grating, and third and fourth control electrodes, positioned to control a refraction property of said liquid crystal material between said third and fourth control electrodes;
a control element, operating to control said first, second, third and fourth control electrodes between first and second control states, said first control state being one in which said liquid crystal material has an index of refraction which substantially matches a refraction of said grating, and said second control state being one in which said liquid crystal material has an index of refraction which mismatch is a refraction of said grating and
a third layer, optically in series with said first and second layers, and including a liquid crystal material therein which is selectively electrically controlled to produce one of a plurality of different virtual gratings therein.

30. A system as in claim 29, further comprising a third and fourth layers, optically in series with said first and second layers, each of said third and fourth layers having a liquid crystal material, two electrodes, and a grating, and a period of each grating being different than a period of each other grating.

31. A method as in claim 23 wherein said controlling comprises controlling a property of at least one of a plurality of layers of the liquid crystal material to control an amount of refraction mismatch between the liquid crystal material and the grating and hence control a refraction of said grating, and also to control another one of said layers to form of virtual grating therein, A system, comprising:
a first layer, including a first grating having a first period a liquid crystal material in contact with said first grating, and first and second control electrodes, positioned to control a refraction property of said liquid crystal material between said first and second control electrodes;
a second layer, optically in series with, said first layer, and including a second grating having a second period which is different than said first period, and a liquid crystal material in contact with said second grating, and third and fourth control electrodes, positioned to control a refraction property of said liquid crystal material between said third and fourth control electrodes; and a control element, operating to control said first, second, third and fourth control electrodes between first and second control states, said first control state being one in which said liquid crystal material has an index of refraction which substantially matches a refraction of said grating, and said second control state being one in which said liquid crystal material has an index of refraction which mismatch is a refraction of said grating, wherein said first period is double said second period.

* * * * *